United States Patent
Fergason

Patent Number: 5,888,603
Date of Patent: *Mar. 30, 1999

[54] STACKED FILMS BIREFRINGENT DEVICE AND METHOD OF MAKING SAME

[76] Inventor: James L. Fergason, 158 Almondral Ave., Atherton, Calif. 94027-3902

[*] Notice: This patent issued on a continued prosecution application filed under 37 CFR 1.53(d), and is subject to the twenty year patent term provisions of 35 U.S.C. 154(a)(2).

[21] Appl. No.: 845,521

[22] Filed: Apr. 24, 1997

Related U.S. Application Data

[60] Provisional application No. 60/016,182 Apr. 24, 1996.
[51] Int. Cl.$^6$ ............... B32B 3/10; B32B 3/18; B32B 27/00
[52] U.S. Cl. .............. 428/46; 428/44; 428/189; 428/411.1; 428/910; 359/485; 359/487; 359/488; 359/494; 359/495; 359/497; 359/500; 359/580; 359/583; 156/250
[58] Field of Search ............. 428/411.1, 480, 428/910, 119, 189, 44, 46; 359/256, 485, 487, 488, 494, 495, 496, 497, 500, 580, 586, 587, 583; 156/250

[56] References Cited

U.S. PATENT DOCUMENTS 3,610,729  10/1971  Rogers ................... 350/157
5,572,341  11/1996  Fergason ................. 359/39

FOREIGN PATENT DOCUMENTS 0 488 544 A1  6/1992  European Pat. Off. .

*Primary Examiner*—Vivian Chen
*Attorney, Agent, or Firm*—Renner, Otto, Boisselle & Sklar, P.L.L.

[57] ABSTRACT

A birefringent material have two major parallel surfaces and a method of making such a material, wherein the said material comprises plural identical uniaxial birefringent polymeric films, each of said uniaxial films having an optical axis, or comprising plural identical biaxial birefringent polymeric films, each of said biaxial films having an acute bisectrix of the optical axes, wherein the material is formed from a stack of said films, with the optical axes or the acute bisectrixes of the films in the stack being aligned, and wherein said stack has been cut or skived at an angle to the optical axes or the acute bisectrixes thereof, such that when incident light passes through said material in a direction perpendicular to said major surfaces of the material, the incident light having a first plane of polarization is displaced relative to the incident light having a second plane of polarization, the first and second planes of polarization being perpendicular to each other.

10 Claims, 2 Drawing Sheets

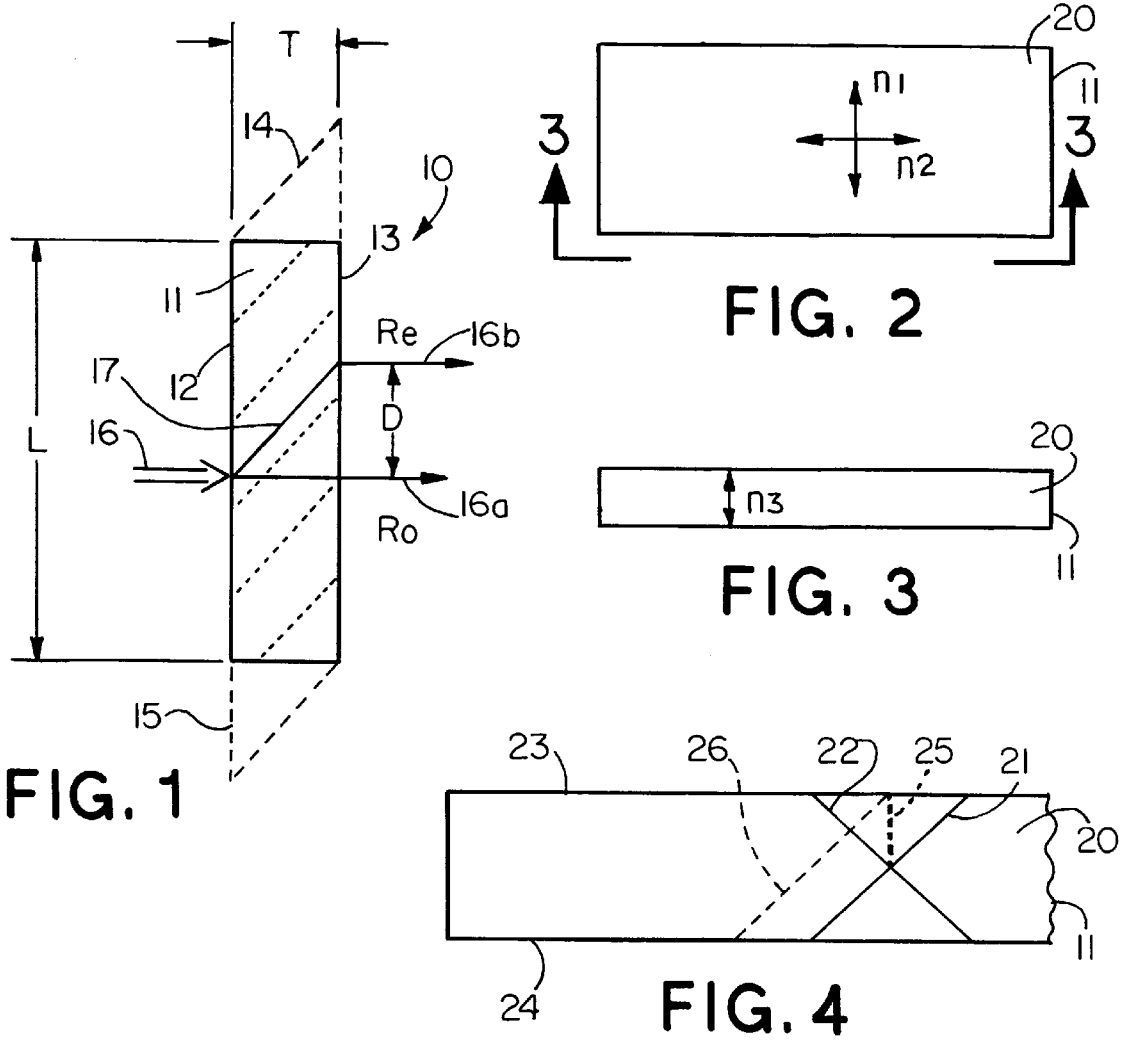
FIG. 1
FIG. 2
FIG. 3
FIG. 4
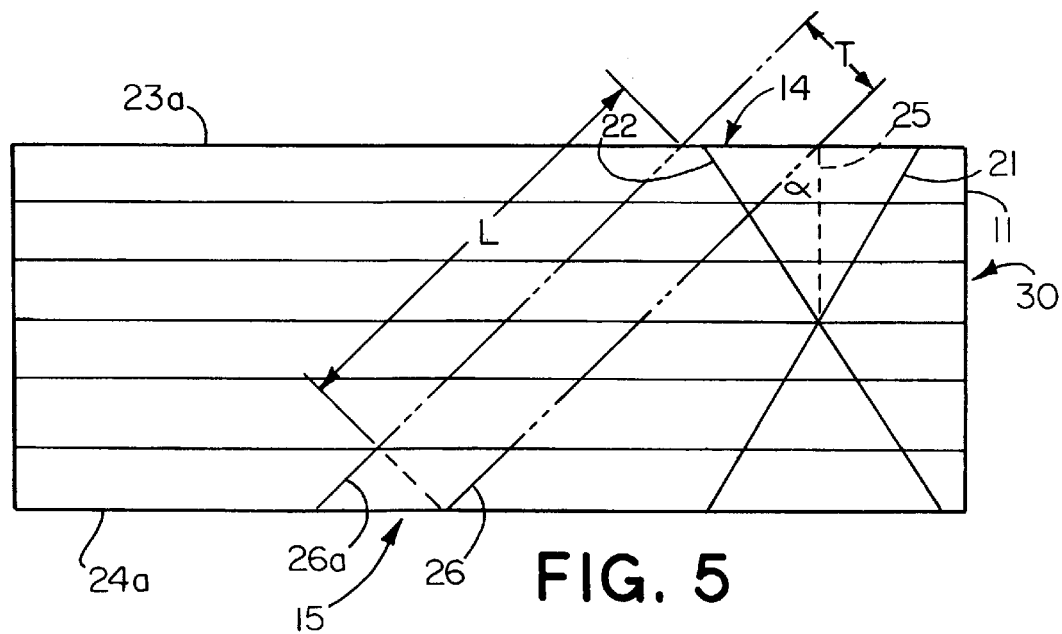
FIG. 5

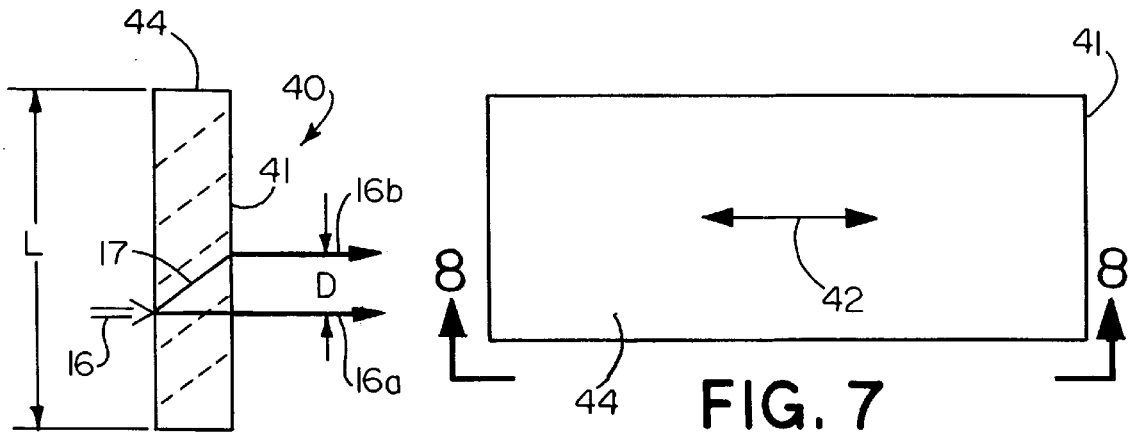
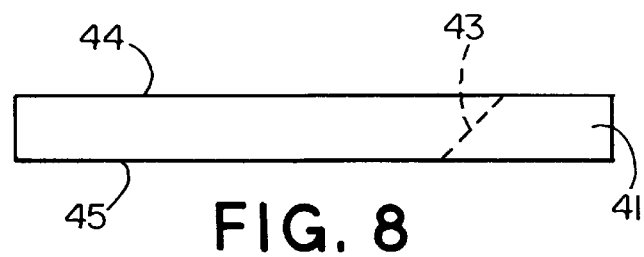
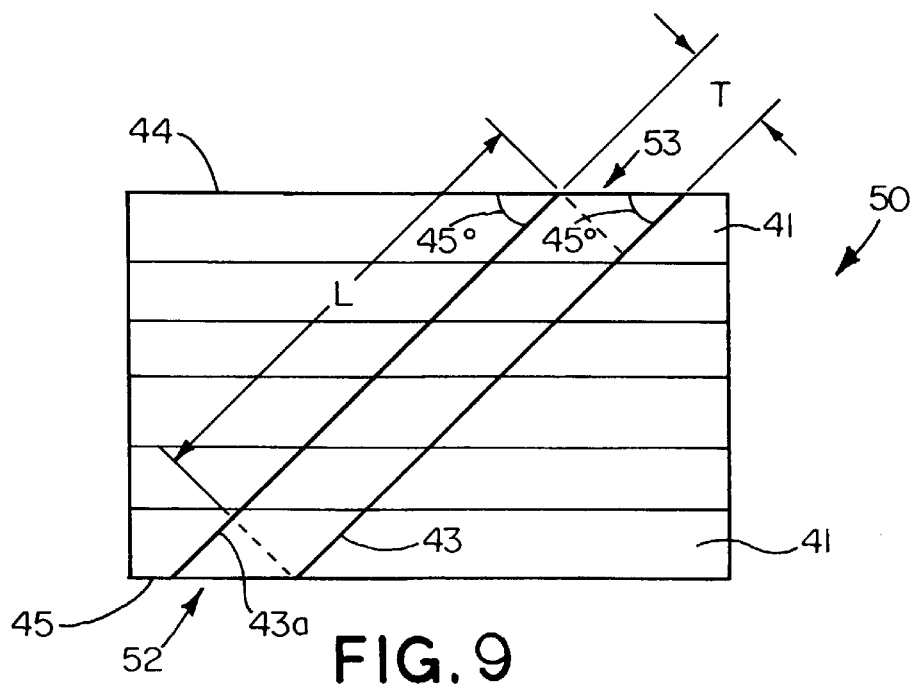

STACKED FILMS BIREFRINGENT DEVICE AND METHOD OF MAKING SAME

This application claims the benefit of U.S. Provisional Application Ser. No. 60/016,182 filed Apr. 24, 1996.

TECHNICAL FIELD

This invention relates generally, as indicated, to a birefringent material and to a method for making a birefringent material.

BACKGROUND

A birefringent material can be used for many purposes. One example is to separate light, such as light rays, images, or the like, and/or to change the direction or location of such light. Such separation and such direction or location changing can be used for a variety of purposes. Examples of devices using birefringent materials are disclosed in U.S. Pat. Nos. 5,572,341 and 5,715,029 and commonly owned U.S. application Ser. No. 08/817,846, filed Apr. 25, 1997, the entire disclosures of which hereby are incorporated by reference. In several embodiments of devices disclosed in such patent applications either the light is transmitted directly through a birefringent material without a change in direction or the direction or location of the light is shifted.

An example of a conventional birefringent material is a crystal made of calcite (calcium carbonate) $CaCO_3$. In the above-mentioned exemplary devices calcite or other birefringent material is able to transmit light directly through the device or to shift or to translate the location of the light, for example, depending on the direction of the electric vector of plane (linear) polarized light relative to the axis of the calcite.

The calcite crystal used in such exemplary devices is birefringent and it is cut or so arranged that it has coplanar surfaces on which light is incident and from which light exits. The direction of incident and exiting light relative to the coplanar surfaces may be normal (perpendicular) to the respective planes of those surfaces. For exemplary descriptive purposes, one axis of the calcite is horizontal and the other is vertical, and the vertical axis either tips forward or backward such that it does not lie in a plane that is parallel with the mentioned coplanar surfaces. For incident plane or linearly polarized light which is incident on one of the coplanar surfaces, if the plane of polarization is perpendicular to the mentioned tilted axis of the calcite crystal, then the light is transmitted directly through the calcite crystal without a change in direction or location of the light; but if the plane of polarization is aligned with the mentioned axis, then there is a shift in the direction of the light and the location where the light exits the calcite crystal is different from the location that the first-mentioned light exits the calcite crystal. The displacement between the two light beams or light rays exiting the calcite crystal depends on the birefringence of the crystal and the thickness of the crystal.

Calcite crystal material of optical quality is relatively expensive. Also, usually the area or size of calcite crystal material is relatively small.

It would be desirable to obtain or to make birefringent material, especially that of good optical quality, that can be used in visual display and viewing devices, for example, while reducing the cost of that material relative to the cost of calcite crystal material. It also would be desirable to facilitate making such material and to enable the making of the material in a variety of sizes, both in terms of area on which light may be incident and thickness.

Birefringent material has different indices of refraction characteristics for different directions or different directions of plane of polarization of light transmitted therethrough. Various film or sheet materials, especially those that are stretched, are known to have birefringence characteristics. For example, a stretched film of polyvinyl alcohol is known to be uniaxial, birefringent, and optically positive. The optical axis usually is in the direction of stretch. Polystyrene is another example of a uniaxial, birefringent material, but polystyrene usually is referred to as being optically negative. The uniaxial films usually have two indices of refraction, one which is in the direction of stretch and the other which is generally perpendicular to the stretched direction.

A polyester film material, such as that sold under the trademark Mylar, is a biaxial material. The biaxial material typically has three indices of refraction. Looking at a top plan view of the material, one axis or index of refraction would be in the direction of stretch or linear extent of the film material and generally in the plane of the material; a second would be perpendicular to the first and also in the generally in the plane of the material; and a third index of refraction would be looking through the material at an edge view of it. In a biaxial film material, such as Mylar, there are two axes along which there is no birefringence exhibited by the material. Those axes typically are referred to as the optical axes or optic axes.

SUMMARY

With the foregoing in mind then, one aspect of the present invention relates to a birefringent device including a stack of stretched films.

Another aspect relates to a method of making a birefringent device including placing a plurality of films, which have birefringent characteristics, in a stacked relation.

Another aspect relates to a birefringent material formed of a stack of birefringent films, sheets or like materials.

Another aspect relates to a birefringent device of plural uniaxial films in stacked relation and cut or skived at an angle such as 45° to the optical axis.

Another aspect relates to a technique and device made thereby for making a birefringent device of stacked biaxial films assembled and arranged so as to function as a birefringent device of stacked uniaxial films.

Another aspect relates to a birefringent material having an orientation of the acute bisectrix or of the optical axis at 45° angle to the layer direction, the layer being formed by slicing or skiving a stack of birefringent films or the like that have the optical axis or acute bisectrix parallel or perpendicular to the film or the like.

Another aspect relates to a birefringent material having an orientation of the acute bisectrix or of the optical axis at 45° angle to the layer direction, the layer being formed by slicing or skiving a stack of polymer birefringent films or the like that have the optical axis or acute bisectrix parallel or perpendicular to the film or the like.

One or more of these and other objects, features and advantages of the present invention are accomplished using the invention described and claimed below.

To the accomplishment of the foregoing and related ends, the invention, then, comprises the features hereinafter fully described and particularly pointed out in the claims appended hereto. The following description and the annexed drawings set forth in detail certain illustrative embodiments of the invention. These embodiments are indicative, however, of but a few of the various ways in which the principles of the invention may be employed.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims if and when appended hereto.

BRIEF DESCRIPTION OF THE DRAWINGS

In the annexed drawings:

FIG. 1 is a side elevation view of a birefringent device using a stack of biaxial film in accordance with an embodiment of the invention showing the effect on light transmitted through the device;

FIG. 2 is a top plan view of one sheet of the biaxial film material;

FIG. 3 is a side elevation view of the sheet of FIG. 2;

FIG. 4 is an enlarged side elevation view of the sheet similar to the illustration in FIG. 3, but now also showing the two optical axes along which there is no birefringence exhibited, the acute bisectrix of the intersection of the two optical axes and the skive or cut direction;

FIG. 5 is a side elevation view of a stack of biaxial sheet or film material from which the birefringent device of FIG. 1 is made, showing the respective optical axes, the acute bisectrix of the two optical axes, and the skive or cut direction to make a birefringent device in accordance with an embodiment of the present invention;

FIG. 6 is a side elevation view of a birefringent device using a stack of uniaxial film in accordance with an embodiment of the invention showing the effect on light transmitted through the device;

FIG. 7 is a top plan view of a sheet of uniaxial film useful in an embodiment of the invention;

FIG. 8 is a side elevation view of the film of FIG. 7 looking generally in the direction of the arrows 8—8 of FIG. 7; and FIG. 9 is a side elevation view of a stack of uniaxial sheet or film material from which the birefringent device of FIG. 6 is made, showing the skive or cut direction to make a birefringent device in accordance with an embodiment of the present invention.

DESCRIPTION

Referring in detail to the drawings, wherein like reference numerals designate like parts in the several figures, and initially to FIG. 1, a birefringent device 10 is shown. The birefringent device 10 is formed of a plurality of sheets or films 11 which are stacked together and are cut in the manner described below. The terms films and sheets may be used synonymously. In the illustrated embodiment the birefringent device 10 is formed of six sheets stacked together. However, the invention may include more or fewer than six sheets. The stack of films 11 is cut or skived, another term for cut here, at an angle. The resulting device has a pair of coplanar surfaces 12, 13. Separation or division between respective layers of film 11 are represented in FIG. 1 by dotted lines. Respective end portions 14, 15, which are outlined by dash lines, typically are removed from the device 10 after the skiving procedure. The end portions 14, 15 may be removed by simply cutting them from the device 10, for example at an angle perpendicular to the surfaces 12, 13 so that the thickness of the device is uniform, including at the remaining ends thereof. (In a special circumstance to obtain a particular effect, it may be desired to have a non-uniform thickness for the device 10.)

The birefringent device 10 may be used as a typical birefringent device, such as the calcite crystal mentioned above. In such use incident light 16 is directed in a direction that is perpendicular or normal to one of the coplanar surfaces, in this case the coplanar surface 12, which will be referred to below as the incident surface. Depending on the optical polarization characteristics of the incident light 16 such light will be transmitted directly through the birefringent device 10, as is represented by the arrow 16a. The light represented by the arrow 16a would have a plane of polarization or electric vector which is in a relation to the ordinary axis of the respective sheets 11 and the birefringent device 10. For example, as was mentioned above, the polarization direction would be in effect perpendicular to the axis of the birefringent device 10.

However, if the plane of polarization or electric vector of the incident light 16 on the incident surface 12 were perpendicular, i.e., crossed, relative to that of the light represented by the arrow 16a, then at the incident surface 12, the light experiences the extraordinary index of refraction of the birefringent material, and the direction of light travel through the birefringent device 10 is altered along the path 17. When the light along path 17 exits the birefringent device 10 at the output coplanar surface 13, it changes direction again to a direction or light represented by the arrow 16b. The direction of light 16b is parallel to the light 16a but the location is shifted or translated away from the location of the arrow 16a by a distance represented in the drawing by the letter D. The distance D depends on and can be changed by changing the thickness dimension T of the birefringent device 10. The displacement distance D also depends on the birefringence of the material of which the birefringent device 10 is made. For example, Mylar has a birefringence that is about ⅔ the birefringence of calcite material. Polystyrene and polyvinyl alcohol have a smaller birefringence than does Mylar. Polystyrene and polyvinyl alcohol are uniaxial films and are described further below.

Polyvinyl alcohol is referred to as optically positive material where as polystyrene is referred to as optically negative material. In the invention they are functionally similar, but the direction that the light 16b is shifted relative to light 16a, e.g., up or down relative to the illustration of FIG. 1, will be in one direction for the optically positive material and will be in the opposite direction for the optically negative material.

Generally the method and apparatus of the invention are similar for biaxial films, such as Mylar, and for uniaxial films, such as polystyrene or polyvinyl alcohol; however, by skiving the biaxial film based on the acute bisectrix, the film functions in the birefringent device similarly to a uniaxial film.

In FIGS. 2 and 3 are top plan and side elevation views of one of the sheets 11 of biaxial material 20, such as Mylar material, used in the birefringent device 10. As is seen in FIGS. 2 and 3, the biaxial material 20 has three different indices of refraction $n_1$, $n_2$, $n_3$, which are determined in perpendicular planes looking down at the sheet in FIG. 2 and in a direction corresponding to the thickness direction or dimension of the sheet material 20 as viewed from the side or end in FIG. 3.

As is shown in FIG. 4, the biaxial material 20 has two optical axes 21, 22, which are a function of the indices of refraction $n_1$, $n_2$ (FIG. 2). The material 20 does not exhibit birefringence along those optical axes 21, 22. The optical axes 21, 22 usually are consistent in direction along the length of the material 20, i.e., many such optical axes which are parallel to a respective optical axis 21 or 22 can be drawn along the length of the material 20. Therefore, the direction and angle of the optical axis 22, for example, when viewed as illustrated in FIG. 4 or when viewed nearer to the left hand edge of the material 20 as shown in FIG. 4, will be the same. The same is true for the optical axis 21.

According to an embodiment of the invention, the acute bisector (sometimes referred to as bisectrix) of the optical axes 21, 22 is determined. Usually the optical axes 21, 22 will be at the same but opposite respective angles to the respective surfaces 23, 24 of the film material 20, as is illustrated in FIG. 4. The acute bisectrix of intersecting optical axes 21, 22 in that case, as is shown by a dotted line 25 in FIG. 4, will be perpendicular to the surfaces 23, 24. The skive direction for the film material 20 is represented by a dash line 26 in FIG. 4. The skive direction is at 45° to the acute bisectrix. As a result, the biaxial material will work in the birefringent device 10 in the same way a uniaxial film or crystal would work. Although specific angles are mentioned herein, it will be appreciated that in the several embodiments hereof other angles and relationships may be used. For example, the optical axes 21, 22 may be at different angles relative to the coplanar surfaces 12, 13; and the acute bisectrix in this case would not be perpendicular to the coplanar surfaces 12, 13. Also, if desired, the skive angle relative to the acute bisectrix may be other than the 45° in order to achieve desired optical properties or characteristics of the birefringent device 10 or system using such device.

Turning to FIG. 5, a stack 30 of biaxial sheets or film 11 is illustrated. This stack includes six sheets 11, and the birefringent device 10 is made from that stack. If desired, the stack 30 may include more or fewer sheets 11. The optical axes 21, 22 of the respective sheets are aligned and are depicted in FIG. 5. The acute bisectrix 25 also is illustrated. The acute bisectrix 25 bisects (equally) the angle formed at the intersection of the optical axes 21, 22.

Skive (cut) lines 26, 26a are shown in FIG. 5, are parallel to each other, and are at an angle of 45° to the acute bisectrix 25, such angle being designated α in FIG. 5. The perpendicular distance between the skive lines 26, 26a is the thickness dimension T of the birefringent device 10. Briefly referring to FIG. 1, the removed or cut off portions 14, 15 from the birefringent device 10 are generally shown in FIG. 5, for example, respectively proximate the surfaces 23a, 24a of the top-most and bottom-most sheets 11 in the stack 30.

The thickness of the sheets of film 11 may be on the order of from about 0.01 millimeter to about 2 millimeters. If desired, the thickness of the sheets 11 may be on the order of from about 0.1 millimeter to about 2 millimeters. The sheets 11 may be on the order of 0.2 millimeters to about 2 millimeters thick. In an embodiment the film thickness of the sheets 11 is on the order of about 0.2 millimeter to about 1.0 millimeter and may be on the order of 0.2 millimeter to about 0.3 millimeter. Also, if desired, the film thickness of the sheets 11 may be on the order of from about 1 millimeter to about 2 millimeters thick. The actual thickness of each sheet 11 ordinarily is not as critical as the thickness dimension T of the slice along the skive lines 26, 26a of the stack 30 that forms the birefringent device 10. The thinner the sheets of film 11, the more are needed to compose the stack 30. Also, the greater the height of the stack, e.g., the vertical dimension as viewed in FIG. 5, the greater can be the length dimension L of the birefringent device 10. The depth or width dimension of the birefringent device 10, e.g., the dimension perpendicular to the plane of the paper of which the drawing of FIG. 1 and the drawing of FIG. 5 are formed, depends on the size of the respective sheets 11, as is evident from the illustrations of the drawings.

To adhere the respective sheets or layers of them 11 together to form the stack 30, ordinarily some type of adhesion is needed. Adhesion may be provided by an adhesive material placed between respective sheets, such as a glue line, preferably a very thin layer of glue. An exemplary adhesive material is methyl cyano acrylate. The thickness of the layer of adhesive material, sometimes referred to as the glue line, preferably is relatively small compared to the thickness of the respective sheets 11.

According to an aspect of the invention, then, the birefringent device 10 is made by preparing a stack or laminate of a plurality of sheets of biaxial film, such as polyester, Mylar, or other biaxial material. The sheets are adhered to each other. The materials are selected and arranged such that the orientation of the acute bisectrix 25 is defined and the skive lines 26, 26a are parallel to each other and are at 45° to the acute bisectrix 25. The stack 30 is skived or sliced along the axes 26, 26a while maintaining relative positioning along the depth of the stack into the plane of the drawings of FIGS. 1 and 5, for example. The thickness dimension T is selected as a function of the desired optical shifting distance D (FIG. 1) for the birefringent device 10.

Using the above described technique to make the birefringent device 10 from biaxial film, the optical effect of the birefringent device is the same or operationally the same as a birefringent device made from uniaxial film which is described further below. The advantage of using a biaxial film, such as Mylar, is that Mylar typically is stronger and tougher than polyvinyl alcohol, polystyrene. However, if such strength or toughness is not needed, then use of polyvinyl alcohol or polystyrene as the film material used in the invention may be appropriate.

Other materials also may be used as the film material in the invention, such as, main chain polymer liquid crystal material, side chain polymer liquid crystal material, and other materials that have birefringence characteristics. The birefringence characteristic may vary widely from material to material.

Most stretched films have a natural birefringence which gives an optical axis in the direction of stretch; this usually is referred to as a uniaxial film. However, a biaxial film gives an acute bisectrix normal to the direction of stretch. By setting the skive direction at 45° to the acute bisectrix the biaxial film 11 works like a uniaxial film, which is described further below.

The birefringent device 10 may be used to shift light from respective pels (also sometimes referred to as picture elements or pixels, e.g., as in the pixels of a display, such as a liquid crystal display or some other display device, specified amounts D. For example, if desired, the shifting amount (distance D) may be the distance (sometimes referred to as the pitch) from one pel to the next so that the output, e.g., light output, from one pel may be superimposed over the output from an adjacent pel. Alternatively, the shifting amount (distance D) may be about one half the distance (pitch) between respective pels, and, therefore, the output from one pel can be shifted into the optical dead space between pels, etc. Various examples of such shifting are presented in the above-mentioned patent applications. The distance D can be selected by determining the indices of refraction and birefringence characteristics of the film material used in the birefringent device 10 and the thickness (including the ordinary optical thickness and the extraordinary optical thickness as well as the actual thickness) of the device 10.

Turning, now, to FIGS. 6–9, another embodiment of birefringent device 40 is shown. The birefringent device 40, which is seen in FIG. 6, for example, is similar to the device 10; and the operation in an optical device or otherwise with respect to transmitting light without shifting or with shifting light as it is transmitted would be the same or substantially the same as the device 10. However, the birefringent device 40 is made from several layers of uniaxial birefringent film 41. Examples of such films include stretched polyvinyl alcohol film or stretched polystyrene film. In the illustrated embodiment there are six layers; but there may be more or fewer layers. Thickness characteristics of the films may be the same or substantially the same as the thickness characteristics or parameters mentioned above.

As is shown in FIG. 7, a top plan view of one of the layers or sheets of film 41, the film is of the stretched type and has an optical axis 42. In the side or edge view of the film 41, as is shown in FIG. 8, the skive (or cut) line 43 is at an angle of 45° with the coplanar surfaces 44, 45 of the film 41 and with the optical axis 42.

In FIG. 9 a stack 50 of six of the films 41 are shown with the skive lines 43, 43a along which the stack is skived or cut to form the birefringent device 40 (FIG. 6). In FIG. 9 the stack 50 is seen from the same edge view as the film 41 is shown in FIG. 8. End portions of the material, such as portions 51, 52 (similar to portions 14, 15 of FIG. 1) may be cut off or removed from the birefringent device 40 after having been cut from the stack 50, to yield the birefringent device as illustrated in FIG. 6.

The size of a birefringent device according to the invention, i.e., the surface area over which it may be operatively exposed to incident light and produce a shifted or unshifted light output, will depend on the thickness of the stack of films used to make the device. The thicker the stack, the longer the dimension L and the larger will be the surface area of the birefringent device.

In making the birefringent device 40, plural layers of uniaxial film 41 are stacked together to form the stack 50. The layers may be adhered to each other by various means, such as adhesive or some other means. In one example, for polystyrene solvent bonding techniques may be used to adhere the respective layers together; solvent bonding being a known technique to adhere together polystyrene materials. In another example, for polyvinyl alcohol, the film material may be cross linked, and then solvent bonding may be used. One example of solvent bonding for polyvinyl alcohol is using water as the solvent. After the material has bonded, the water may diffuse through the system for dissipation, evaporation, or the like into the external environment. Care should be taken in the various embodiments that the bonding technique does not misalign the stretched film or cause a misalignment of the stretched film or the axis (axes) thereof.

After the films 41 are adhered, they may be cut along the skive lines 43, 43a. The end portions 52, 53 (14, 15) may be removed, and the resulting product is the birefringent device 40.

It will be appreciated that the invention provides a new birefringent device and a method of making it in a relatively inexpensive way using relatively inexpensive materials. Relatively large and relatively small size birefringent devices may be made, and the optical thickness and optical shifting characteristics can be selected as may be desired.

Thus, an aspect of the invention is a birefringent material comprising a stack of birefringent film or sheets.

Another aspect is a stack of birefringent film materials of uniaxial or biaxial character, cut to provide desired birefringence function.

Another aspect is a method of making a birefringent device by stacking together a plurality of axial or biaxial films.

A further aspect includes a method of making a birefringent device which functions as though made using a stack of uniaxial films but which actually uses a stack of biaxial films.

Yet another aspect concerns a technique for relatively easily making large or small surface area birefringent devices.

Yet a further aspect relates to a technique for relatively easily making a birefringent device that has a selected amount of birefringence.

Yet an additional aspect concerns a method of making a birefringent device and a birefringent device, wherein a birefringent material having an orientation of the acute bisectrix or the optical axis at a 45° angle to the layer direction is formed by slicing or skiving a stack of birefringent layers, for example, polymeric birefringent layers oriented such that the optical axis or acute bisectrix is parallel or perpendicular to the surface of the film.

I claim:

1. A birefringent material having two parallel major surfaces,
    said material comprising plural identical uniaxial birefringent polymeric films, each of said films having an optical axis,
        wherein the material is formed from a stack of said films,
    with the optical axes of the films in the stack being aligned,
        and wherein said stack has been skived at an angle to the optical axes thereof,
        such that when incident light passes through said material in a direction perpendicular to said major surfaces of the material, the incident light having a first plane of polarization is displaced relative to the incident light having a second plane of polarization, the first and second planes of polarization being perpendicular to each other.

2. The material of claim 1, further comprising means for retaining the films in positional relation, said means for retaining comprising adhesive.

3. The material of claim 1, wherein said angle to the optical axes is 45 degrees.

4. A birefringent material having two parallel major surfaces,
    said material comprising plural identical biaxial birefringent polymeric films, each of said films having an acute bisectrix of the optical axes,
        wherein the material is formed from a stack of said films,
    with the acute bisectrixes of the films in the stack being aligned,
        and wherein said stack has been skived at an angle to the acute bisectrixes thereof,
        such that when incident light passes through said material in a direction perpendicular to said major surfaces of the material, the incident light having a first plane of polarization is displaced relative to the incident light having a second plane of polarization, the first and second planes of polarization being perpendicular to each other.

5. The material of claim 4, further comprising means for retaining the films in positional relation, said means for retaining comprising adhesive.

6. The material of claim 4, wherein said angle to the acute bisectrixes is 45 degrees.

7. A birefringent material having two parallel major surfaces, said material comprising plural identical uniaxial birefringent polymeric films, each of said uniaxial films having an optical axis, or comprising plural identical biaxial birefringent polymeric films, each of said biaxial films having an acute bisectrix of the optical axes, said method comprising:

stacking said uniaxial or biaxial films such that the optical axes or the acute bisectrixes of the films in the stack are aligned, skiving said stack at an angle to said optical axes or said acute bisectrixes thereof, to form the major surfaces of the material, such that when incident light passes through said material in a direction perpendicular to said major surfaces of the material, the incident light having a first plane of polarization is displaced relative to the incident light having a second plane of polarization, the first and second planes of polarization being perpendicular to each other.

8. The method of claim 7, wherein said stacking comprises stacking a plurality of biaxial films in alignment to function as though a stack of uniaxial films.

9. The method of claim 7, further comprising selecting the birefringent films to provide a birefringent device that has a selected amount of birefringence.

10. The method of claim 7, further comprising retaining the films in a positional relation by means of an adhesive, prior to said skiving.

* * * * *